United States Patent [19]

January et al.

[11] 3,860,668

[45] Jan. 14, 1975

[54] ALKYL BENZENE ISOMERISATION PROCESS

[75] Inventors: John Kenneth January; Alan Marchant, both of Stockton-on-Tees, England

[73] Assignee: Imperial Chemical Industries Limited, London, England

[22] Filed: Oct. 24, 1973

[21] Appl. No.: 409,317

[30] Foreign Application Priority Data
Oct. 24, 1972  Great Britain.................... 48927/72

[52] U.S. Cl............................................. 260/668 A
[51] Int. Cl............................................... C07c 5/24
[58] Field of Search................................ 260/668 A

[56] References Cited
UNITED STATES PATENTS
2,705,248  3/1955  Coats et al...................... 260/668 A
3,200,162  8/1965  Kawai............................. 260/668 A Primary Examiner—C. Davis
Attorney, Agent, or Firm—Cushman, Darby & Cushman

[57] ABSTRACT

Alkyl benzenes are isomerised using a non-hydrogenating catalyst in the presence of a cyclic hydrocarbon having single bonds between carbon atoms in a ring.

8 Claims, No Drawings

ALKYL BENZENE ISOMERISATION PROCESS

This invention relates to an alkyl benzene isomerisation process.

According to the invention a feedstock comprising at least one alkyl benzene is isomerised by contacting it with a silica/alumina catalyst which is free from any hydrogenating component in the presence of a cyclic hydrocarbon in which at least four, and preferably five, or six, carbon-carbon links in a ring are single bonds, any others being aromatic links. The isomerisation is suitably carried out in the absence of hydrogen. By a "hydrogenating component" is meant a component which would hydrogenate the alkyl benzene to the corresponding naphthene under the conditions of the reaction if hydrogen were present.

The cyclic hydrocarbon may advantageously have five to 14, and preferably six to 12, and more preferably six to 10, carbon atoms, and preferably has a six-membered ring which is preferably saturated. It may be a monocyclic or fused ring polycyclic hydrocarbon and may comprise alkyl or cycloalkyl substituents. Suitable cyclic hydrocarbons include the octahydroanthracenes, and preferably Tetralin, Decalin, cyclohexane, cyclohexyl cyclohexane, and their alkyl, especially $C_1$ to $C_4$ alkyl, substituted derivatives, for example methyl cyclohexane and the di-, tri- and tetra-methyl cyclohexanes, ethyl cyclohexane, ethylmethyl- and diethyl-cyclohexanes.

The cyclic hydrocarbon is preferably present in a concentration of 1 to 20 percent, and preferably 1½ to 12 percent by weight, of the feedstock.

The catalyst may be crystalline but is very suitably amorphous and preferably contains 7 to 40 percent by weight of alumina, the balance being substantially silica. It is preferred that the catalyst has a surface area in the range 50 to 700 aquare metres/gram, and preferably 70 to 400 square metres/gram. The mean pore diameter of the catalyst is preferably in the range 10 to 400 A. The catalyst may, if desired, be contacted at least once, for example 1 to 5 times, with an acid, for a period of, for example, 1 to 500 hours before use. Suitable acids include sulphuric acid, hydrochloric acid, hydrofluoric acid, hydrobromic acid, nitric acid and trihaloacetic acids (for example trichloracetic acid) and mixtures thereof. An example of such acids is aqueous nitric acid, for example at a concentration of 0.1N to 10N. Preferably the catalyst is washed with water after each such treatment with acid.

The isomerisation may be carried out in the presence of water vapour in a concentration of, for example 500 to 10,000, and preferably 1,000 to 5,000 parts per million by weight of the feedstock.

The process is preferably carried out at a temperature in the range 200° to 600°C, more preferably in the range 400° to 500°C, and preferably at a pressure of 1 to 5 bars absolute.

It is preferred to isomerise at least one dialkyl benzene having at most four carbon atoms in each alkyl group, especially a xylene. The xylene feedstock may, for example, be a mixture of metaxylene together with ethyl benzene, ortho- and/or para-xylene.

According to a preferred form of the invention a feedstock comprising one or more xylenes containing less than an equilibrium amount of paraxylene is isomerised to produce a product having a higher concentration of paraxylene.

In the production of paraxylene it is a common practice to separate paraxylene by cooling a mixture comprising paraxylene and at least on other xylene and/or ethyl benzene to crystallise it, separating the crystals (for example by filtering or centrifuging) and isomerising the mother liquor to increase its paraxylene concentration. The presence of the cyclic hydrocarbon in the isomerisate tends in subsequent cooling to result in the separation of more paraxylene by depressing the temperature at which eutectics of paraxylene are formed. The product of isomerisation may contain toluene and $C_9$ alkyl benzenes and it may be distilled to remove them. It is a feature of using as the cyclic hydrocarbon of this invention a trimethyl cyclohexane or ethyl cyclohexane, and to a lesser extent dimethyl cyclohexanes, that this distillation will not remove an undue amount of them as they boil in a similar range to the xylenes. On the other hand it may be desired to limit the minimum temperatures attained in cooling by removing the cyclic hydrocarbon before the cooling step and in this case a cyclic hydrocarbon readily separable from xylenes by distilling, for example cyclohexane, may be preferred. Cyclohexane may be separated by recovering a light ends fraction from the product of isomerisation, the fraction comprising benzene, toluene and cyclohexane, preferably distilling toluene from the fraction and separating cyclohexane in a substantially pure state by extractive distillation from the fraction. The extractive solvent may be, for example phenol. However, if desired, a fraction consisting essentially of cyclohexane and benzene, for example containing 1 to 50 percent by weight of benzene, may be recovered by distillation and hydrogenated to give cyclohexane in a substantially pure state. This may be done at a temperature of 125° to 275°C, and at a total pressure of 10 to 40 bars in the liquid or vapour phase and in the presence of an aromatics hydrogenation catalyst, for example a nickel catalyst which is suitably Raney nickel or a supported nickel catalyst. The molar proportion of hydrogen to benzene may be in the range 5 : 1 to 20 : 1.

According to a further form of the invention a feedstock comprising one or more xylenes containing less than an equilibrium amount of orthoxylene is isomerised to produce a product having a greater concentration of orthoxylene.

If a xylenes isomerisation plant has stills for removing materials boiling above and below the xylenes range after isomerisation to leave a xylenes fraction (which may also contain ethyl benzene), and one or more xylenes are then separated from the xylenes fraction, the remainder of the fraction being isomerised to increase the concentration of the desired xylenes, the cyclic hydrocarbon may, if it can be distilled with the xylenes fraction, be introduced at any point in the system as a mixture with other hydrocarbons which separate with the materials boiling above and below the xylenes range.

EXAMPLE 1

329 g. of silica-alumina catalyst having an analysis of 10 percent alumina and 90 percent silica, a surface area of 294 $m^2g^{-1}$ and a pore diameter of 74 A in the form of 4 mm. beads were charged to a continuous fixed bed reactor and heated up under nitrogen to 450°C.

Mixed xylenes of composition 1.04% toluene, 8.6 percent benzene, 8.5 percent paraxylene, 55.0 percent metaxylene and 25.5 percent orthoxylene (by weight), were fed to the reactor as a vapour at 450°C and 1.5 bars pressure absolute. Water was injected at a rate of 1,020 parts per million by weight based on the feed. At the end of a 12 hr. run the reactor was purged free of xylenes with nitrogen. The catalyst was then regenerated in a controlled burning-off process between 450° and 560°C to remove the carbon.

The above run was then repeated under the same conditions, but cyclohexane was added to the feedstock to give the following composition (by weight), 5.0 percent cyclohexane, 0.99 percent toluene, 8.2 percent ethyl benzene, 8.1 percent paraxylene, 52.2 percent metaxylene and 24.2 percent orthoxylene.

Weight hourly space velocity (WHSV), the amounts of products in the effluent stream and percentage carbon deposited on the catalyst are given in Table 1.

|  | Untreated Feedstock | Feedstock Treated With Cyclohexane |
|---|---|---|
| WHSV (h⁻¹) | 2.24 | 2.24 |
| Paraxylene in product* (% wt.) | 16.3 | 15.9 |
| Increase* (% wt.) | 7.8 | 7.8 |
| Xylenes converted to other material* (% wt.) | 4.3 | 3.2 |
| Percent carbon on catalyst (by weight) | 0.24 | 0.10 |

*Average for 4 samples taken after 3, 6, 9 and 12 hours on-line.

EXAMPLE 2

The procedure detailed in Example 1 was followed, except that methyl cyclohexane was substituted for cyclohexane, giving a feedstock of the following composition (by weight), 5.0 percent methyl cyclohexane, 0.99 percent toluene, 8.2 percent ethyl benzene, 8.1 percent paraxylene, 52.2 percent metaxylene and 24.2 percent orthoxylene.

Weight hourly space velocity (WHSV), the amounts of products in the effluent stream and percentage carbon deposited on the catalyst are given in Table 2.

|  | Untreated Feedstock | Feedstock Treated With Methyl-cyclohexane |
|---|---|---|
| WHSV (H⁻¹) | 2.24 | 2.24 |
| Paraxylene in product* (% wt.) | 16.2 | 16.3 |
| Increase* (% wt.) | 7.7 | 8.2 |
| Xylenes converted to other material* (% wt.) | 4.1 | 3.2 |
| Percent carbon on catalyst (by weight) | 0.28 | 0.06 |

*Average for 4 samples taken after 3, 6, 9 and 12 hours on-line.

EXAMPLE 3

The procedure detailed in Example 1 was followed, except that Tetralin was substituted for cyclohexane, giving a feedstock of the following composition (by weight), 7.0 percent Tetralin, 0.97 percent toluene, 8.0 percent ethyl benzene, 7.9 percent paraxylene, 51.2 percent metaxylene and 23.7 percent orthoxylene.

Weight hourly space velocity (WHSV), the amounts of products in the effluent stream and percentage carbon deposited on the catalyst are given in Table 3.

|  | Untreated Feedstock | Feedstock Treated With Tetralin |
|---|---|---|
| WHSV (h⁻¹) | 2.24 | 2.24 |
| Paraxylene in product* (% wt.) | 16.3 | 15.5 |
| Increase* (% wt.) | 7.8 | 7.6 |
| Xylenes converted to other materials* (% wt.) | 4.2 | 3.2 |
| Percent carbon on catalyst (by weight) | 0.27 | 0.14 |

*Average for 4 samples taken after 3, 6, 9 and 12 hours on-line.

EXAMPLE 4

276 g. of a silica-alumina catalyst having an analysis of 10 percent alumina and 90 percent silica, a surface area of 137 m²g⁻¹ and a pore diameter of 156 A in the form of 4 mm. beads were charged to a continuous fixed bed reactor and heated up under nitrogen to 450°C.

Mixed xylenes of composition 1.30 percent toluene, 4.0 percent ethyl benzene, 8.2 percent paraxylene, 55.9 percent metaxylene and 28.7 percent orthoxylene (by weight) were fed to the reactor as a vapour at 450°C and 1.5 bars pressure absolute. Water was injected at a rate of 1,020 parts per million by weight based on the feed. At the end of a 12 hr. run the reactor was purged free of xylenes with nitrogen. The catalyst was then regenerated in a controlled burning-off process between 450° and 560°C to remove the carbon.

The above run was then repeated under the same conditions, but cyclohexane was added to the feedstock to give the following composition (by weight), 7.5 percent cyclohexane, 1.20 percent toluene, 3.7 percent ethyl benzene, 7.6 percent paraxylene, 51.7 percent metaxylene and 26.6 percent orthoxylene.

Weight hourly space velocity (WHSV), the amounts of products in the effluent stream and percentage carbon deposited on the catalyst are given in Table 4.

|  | Untreated Feedstock | Feedstock Treated With Cyclohexane |
|---|---|---|
| WHSV (h⁻¹) | 1.33 | 1.33 |
| Paraxylene in product* (% wt.) | 17.9 | 17.9 |
| Increase* (% wt.) | 9.7 | 10.3 |
| Xylenes converted to other materials* (% wt.) | 5.5 | 2.6 |
| Percent carbon on catalyst (by weight) | 0.11 | 0.05 |

*Average for 4 samples taken after 3, 6, 9 and 12 hours on-line.

EXAMPLE 5

330 g. of a silica-alumina catalyst having an analysis of 10 percent alumina and 90 percent silica, a surface area of 194 m²g⁻¹ and a pore diameter of 107 A in the form of 4mm. beads were charged to a continuous fixed bed reactor and heated up under nitrogen to 450°C.

The procedure detailed in Example 4 was followed, except that a mixture of mainly ethyl- and some dimethyl cyclohexanes was substituted for cyclohexane, giving a feedstock of the following estimated composition (by weight): 3.6 percent ethyl cyclohexane, 1.3 percent dimethyl cyclohexanes, 1.24 percent toluene, 3.8 percent ethyl benzene, 7.8 percent paraxylene, 53.1 percent metaxylene and 27.3 percent orthoxylene.

Weight hourly space velocity (WHSV), the amounts of products in the effluent stream, and percentage carbon deposited on the catalyst are given in Table 5.

|  | Untreated Feedstock | Feedstock Treated With Ethyl- and Dimethyl Cyclohexanes |
| --- | --- | --- |
| WHSV (h⁻¹) | 2.23 | 2.23 |
| Paraxylene in product* (% wt.) | 17.0 | 17.0 |
| Increase* (% wt.) | 8.8 | 9.2 |
| Xylenes converted to other materials* (% wt.) | 3.9 | 2.8 |
| Percent carbon on catalyst (by weight) | 0.35 | 0.14 |

*Average for 4 samples taken after 3, 6, 9 and 12 hours on-line.

EXAMPLE 6

326 g. of a silica-alumina catalyst having an analysis of 10 percent alumina and 90 percent silica, a surface area of 194 m²g⁻¹ and a pore diameter of 107 A in the form of 4 mm. beads were charged to a continuous fixed bed reactor and heated up under nitrogen to 450°C.

The procedure detailed in Example 4 was followed, except that a mixture of mainly trimethyl cyclohexanes with traces of dimethyl-, ethyl methyl-, diethyl-, ethyl dimethyl- and tetramethyl-cyclohexanes was substituted for cyclohexane, giving a feedstock of the following estimated composition (by weight) ca. 3.7 percent trimethyl cyclohexanes, ca. 1.2 percent dimethyl-, ethyl methyl-, diethyl-, ethyl dimethyl- and tetramethyl-cyclohexanes, 1.24 percent toluene, 3.8 percent ethyl benzene, 7.8 percent paraxylene, 53.1 percent metaxylene and 27.3 percent orthoxylene.

Weight hourly space velocity (WHSV), the amounts of products in the effluent stream and percentage carbon deposited on the catalyst are given in Table 6.

|  | Untreated Feedstock | Feedstock Treated With Mixed C₈ to C₁₀ Cyclohexane |
| --- | --- | --- |
| WHSV (h⁻¹) | 2.26 | 2.26 |
| Paraxylene in product* (% wt.) | 16.2 | 16.0 |
| Increase* (% wt.) | 8.0 | 8.2 |
| Xylenes converted to other materials* (% wt.) | 3.5 | 2.8 |
| Percent carbon on catalyst (by weight) | 0.43 | 0.21 |

*Average for 4 samples taken after 3, 6, 9 and 12 hours.

EXAMPLE 7

326 g. of a silica-alumina catalyst having an analysis of 10 percent alumina and 90 percent silica, a surface area of 194 m²g⁻¹ and a pore diameter of 107 A in the form of 4 mm. beads were charged to a continuous fixed bed reactor and heated up under nitrogen to 450°C.

The procedure detailed in Example 4 was followed, except that a mixture of mainly C₉ naphthenes (30 percent) with traces of C₁₀ (1½ percent) and C₁₁ naphthenes with other hydrocarbons (mainly paraffinic to 100 percent) was substituted for cyclohexane, giving a feedstock of the following estimated composition (by weight), ca. 1.5 percent C₉ naphthenes, ca. 0.075 percent C₁₀ naphthenes, trace C₁₁ naphthenes, 1.24 percent toluene, 3.8 percent ethyl benzene, 7.8 percent paraxylene, 53.1 percent metaxylene and 27.3 percent orthoxylene.

Weight hourly space velocity (WHSV), the amounts of products in the effluent stream and percentage carbon deposited on the catalyst are given in Table 7.

|  | Untreated Feedstock | Feedstock Treated With Mixed C₉ - C₁₁ naphthenes |
| --- | --- | --- |
| WHSV (h⁻¹) | 1.13 | 1.13 |
| Paraxylene in product* (% wt.) | 18.0 | 17.5 |
| Increase* (% wt.) | 9.8 | 9.7 |
| Xylenes converted to other materials* (% wt.) | 6.1 | 5.0 |
| Percent carbon on catalyst (by weight) | 0.33 | 0.22 |

*Average for 4 samples taken after 3, 6, 9 and 12 hours on-line.

EXAMPLE 8

276 g. of a silica-alumina catalyst having an analysis of 10 percent alumina and 90 percent silica, a surface area of 137 m²g⁻¹ and pore diameter of 156 A in the form of 4 mm. beads were charged to a continuous fixed bed reactor and heated up under nitrogen to 450² C. Mixed xylenes of composition 1.30 percent toluene, 4.0 percent ethyl benzene, 8.2 percent paraxylene, 55.9 percent metaxylene and 28.7 percent orthoxylene (by weight) were fed to the reactor as a vapour at 450°C and 1.5 bars pressure absolute. Water was injected at a rate of 1020 parts per million by weight based on the feed. At the end of a 12 hour run the reactor was purged free of xylenes with nitrogen. The catalyst was then regenerated in a controlled burningoff process between 450° and 560°C to remove the carbon.

The above run was then repeated under the same conditions, but cyclo-octane was added to the feedstock to give the following composition (by weight); 5.0 percent cyclo-octane, 1.24 percent toluene, 3.8 percent ethyl benzene, 7.8 percent paraxylene, 53.1 percent metaxylene and 27.3 percent orthoxylene.

Weight hourly space velocity (WHSV), the amounts of products in the effluent stream and percent carbon deposited on the catalyst are given in Table 8.

|  | Untreated Feedstock | Feedstock Treated With Cyclo-octane |
| --- | --- | --- |
| WHSV ($h^{-1}$) | 1.33 | 1.33 |
| Paraxylene in product* (% wt.) | 17.7 | 17.8 |
| Increase* (% wt.) | 9.5 | 10.0 |
| Xylenes converted to other materials* (% wt.) | 5.2 | 3.8 |
| Percent carbon on catalyst (by weight) | 0.19 | 0.15 |

*Average for 4 samples taken after 3, 6, 9 and 12 hours on-line

In examples 4 and 8 the catalyst before use was stood in 1 N nitric acid for two periods of 24 hours and in water for 3 periods of 24 hours, and then dried at 200°C for 16 hours before use.

EXAMPLE 9

365 g. of a silica-alumina catalyst having an analysis (by weight) of 10 percent alumina and 90 percent silica, a surface area of 163 $m^2g^{-1}$ and a mean pore diameter of 116 A in the form of 4 mm. beads were charged to a continuous fixed bed reactor and heated up under nitrogen to 450°C.

Cyclohexane was added to mixed xylenes to give a feed with the composition 4.8 percent cyclohexane, 1.28 percent toluene, 7.0 percent ethyl benzene, 7.9 percent paraxylene, 52.4 percent metaxylene and 24.4 percent orthoxylene (by weight). This feed was passed through the catalyst at 450°C and 1.5 bars absolute pressure with water injected at a rate of 4,700 parts per million by weight based on the feed. At the end of the run the reactor was purged free of xylenes with nitrogen and the catalyst was regenerated in a controlled burning-off process between 450° and 560°C to remove carbon.

The above run was then repeated but no cyclohexane was added and the feed composition was 1.35 percent toluene, 7.4 percent ethyl benzene, 8.3 percent paraxylene, 55.0 percent metaxylene and 25.6 percent orthoxylene.

Weight hourly space velocity (WHSV) and the amounts of products in the effluent stream are shown in Table 9.

|  | Untreated Feedstock | Feedstock Treated With Cyclohexane |
| --- | --- | --- |
| WHSV ($h^{-1}$) | 0.85 | 0.90 |
| Paraxylene in product* (% wt.) | 16.3 | 16.7 |
| Increase* (% wt.) | 8.0 | 8.8 |
| Xylenes converted to other materials* (% wt.) | 2.8 | 1.9 |

*Average for 4 samples taken after 24, 48, 72 and 96 hours on-line.

EXAMPLE 10

332 g. of a silica-alumina catalyst having an analysis (by weight) of 10 percent alumina and 90 percent silica, a surface area of 178 $m^2g^{-1}$ and a mean pore diameter of 114 A in the form of 4 mm. beads were charged to a continuous fixed bed reactor and heated up under nitrogen to 450°C.

Cyclohexane was added to mixed xylenes to give a feed with the composition 4.8 percent cyclohexane, 1.28 percent toluene, 7.0 percent ethylbenzene, 7.9 percent paraxylene, 52.4 percent metaxylene and 24.4 percent orthoxylene (by weight). This feed was passed through the catalyst at 450°C and 1.5 bars absolute pressure. At the end of a 12 hour run the reactor was purged free of xylenes with nitrogen and the catalyst was regenerated in a controlled burning-off process between 450° and 560°C to remove carbon.

The above run was then repeated but no cyclohexane was added and the feed composition was 1.35 percent toluene, 7.4 percent ethylbenzene, 8.3 percent paraxylene, 55.0 percent metaxylene and 25.6 percent orthoxylene.

Weight hourly space velocity (WHSV), the amounts of products in the effluent stream, and percentage carbon deposited on the catalyst are shown in Table 10.

|  | Untreated Feedstock | Feedstock Treated With Cyclohexane |
| --- | --- | --- |
| WHSV ($h^{-1}$) | 2.22 | 2.34 |
| Paraxylene in product* (% wt.) | 15.0 | 15.0 |
| Increase* (% wt.) | 6.7 | 7.1 |
| Xylenes converted to other materials* (% wt.) | 2.1 | 1.3 |
| Carbon on catalyst (by weight) | 0.32 | 0.19 |

*Average for 4 samples taken after 3, 6, 9 and 12 hours on-line.

These Examples readily illustrate the increase in selectivity to paraxylene together with the reduced carbon laydown on the catalyst which are achieved when isomerisation is carried out in the presence of various cyclic hydrocarbons according to the process of the invention.

We claim:

1. A process for isomerising an alkyl benzene which comprises contacting a feedstock comprising at least one alkyl benzene with a silica/alumina catalyst which is free from any hydrogenating component which would hydrogenate said alkyl benzene to the corresponding naphthene, in the presence of a cyclic hydrocarbon added to the feedstock in a concentration of 1 to 20 percent by weight of the feedstock, said cyclic hydrocarbon being selected from the group consisting of an octahydroanthracene, Tetralin, Decalin, cyclohexane, cyclohexyl cyclohexane, methyl cyclohexane, a di-, tri- or tetramethyl cyclohexane, ethyl cyclohexane, ethylmethyl- and diethyl-cyclohexanes.

2. A process as claimed in claim 1 in which the catalyst has been treated before use by contact with an acid.

3. A process as claimed in claim 1 in which the isomerisation is carried out in the presence of water vapour.

4. A process as claimed in claim 3 in which the concentration of water vapour lies in the range 500 to 10,000 parts per million by weight of feedstock.

5. A process as claimed in claim 1 in which the feedstock comprises at least one dialkyl benzene having at most four carbon atoms in each alkyl group.

6. A process as claimed in claim 5 in which the feedstock comprises a xylene.

7. A process as claimed in claim 1 which comprises isomerising a feedstock comprising at least one xylene by contact with an amorphous silica/alumina catalyst which contains 7 to 40 percent alumina, the balance being substantially silica, and which is free from any hydrogenating component in the presence of 1½ to 12 percent by weight (based on the feedstock) of cyclohexane and in the presence of 1,000 to 5,000 parts per million by weight (based on the feedstock) of water vapour.

8. A process as claimed in claim 1 in which the cyclic hydrocarbon is cyclohexane.

* * * * *